UNITED STATES PATENT OFFICE.

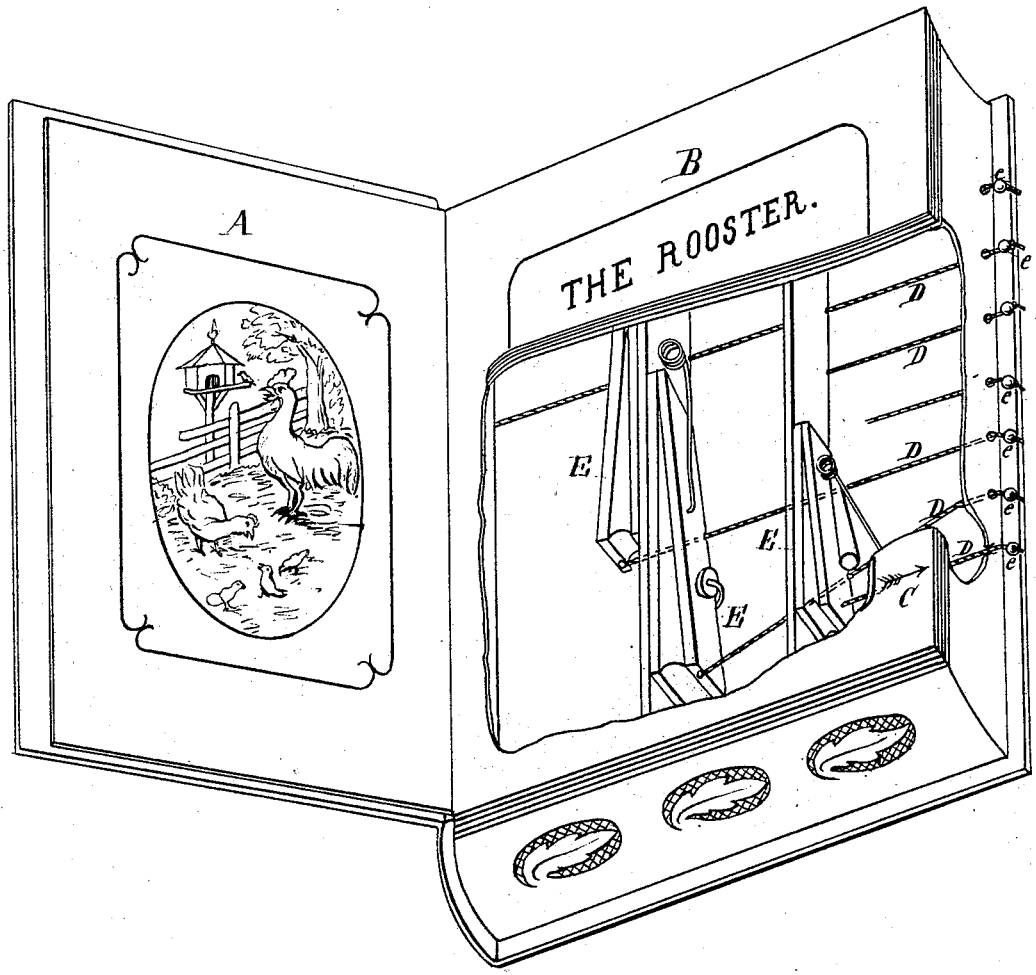

THEODOR BRAND, OF SONNEBERG, GERMANY.

IMPROVEMENT IN SPEAKING PICTURE-BOOKS.

Specification forming part of Letters Patent No. 223,108, dated December 30, 1879; application filed October 15, 1879; patented in Germany, December 3, 1878.

*To all whom it may concern:*

Be it known that I, THEODOR BRAND, of Sonneberg, in Germany, have invented a new and useful Improvement in Speaking Picture-Books, of which the following is a specification.

The invention relates to picture-books combining in the book form, with pictures of animals or human beings, mechanical means for producing sounds in imitation of the voices of the beings represented.

In the accompanying drawing, in which similar letters of reference indicate like parts, A represents one of the picture-sheets bound in a book. The reverse side of each picture-sheet may contain text referring to the picture on the preceding sheet. At B part of the text-page is shown, with the title "The Rooster," referring to the picture on the opposite page, A. The greater part of the sheet B is represented cut off, so as to show the mechanism beneath. On this sheet B, which, however, may also contain a picture on the exposed side, an arrow, C, is shown, which points to one of the strings D, having heads $e$ fastened to their ends. By pulling the head or string to which the arrow points a mechanism is operated which imitates the voice of the subject represented on the picture.

E are bellows and whistles of the well-known construction for imitating different voices, and operated by the strings D. They are inclosed in a box so combined and bound together with the picture-sheets that the whole represents the appearance of a book.

What I claim as my invention is—

1. The combination, in book form, of picture-sheets and sound-producing mechanism for imitating the voices of different animals, substantially as described and shown.

2. The combination, in book form, of a picture and text sheets, with indicating-arrows impressed thereon, sound-producing mechanism for imitating different voices, and operating-strings, all substantially as and for the purpose described.

THEODOR BRAND.

Witnesses:
MAX ORTELLI,
E. ARNOLD.